United States Patent
Dong et al.

(10) Patent No.: US 12,510,216 B2
(45) Date of Patent: Dec. 30, 2025

(54) BRACKET FOR A LIGHT STRIP

(71) Applicant: SIGNIFY HOLDING B.V., Eindhoven (NL)

(72) Inventors: Ping Dong, Shanghai (CN); Jiayun Cao, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/854,180

(22) PCT Filed: Apr. 4, 2023

(86) PCT No.: PCT/EP2023/058766
§ 371 (c)(1),
(2) Date: Oct. 4, 2024

(87) PCT Pub. No.: WO2023/198513
PCT Pub. Date: Oct. 19, 2023

(65) Prior Publication Data
US 2025/0354667 A1    Nov. 20, 2025

(30) Foreign Application Priority Data

Apr. 12, 2022   (WO) ................ PCT/CN2022/086354
May 16, 2022   (EP) ..................................... 22173539

(51) Int. Cl.
*F21S 4/22*         (2016.01)
(52) U.S. Cl.
CPC ...................................... *F21S 4/22* (2016.01)
(58) Field of Classification Search
None
See application file for complete search history.

(56) References Cited

U.S. PATENT DOCUMENTS 4,852,832 A * 8/1989 Delaney .................... F16L 3/08
248/65
2021/0249787 A1    8/2021 Schuss et al.

FOREIGN PATENT DOCUMENTS

| CN | 206347512 U | 7/2017 |
|---|---|---|
| CN | 209042056 U | 6/2019 |
| CN | 110345423 A | 10/2019 |
| CN | 107062046 B | 9/2020 |
| CN | 214525779 U | 10/2021 |
| CN | 111503550 B | 8/2022 |
| JP | 2018510461 A | 4/2018 |
| JP | 2020534678 A | 11/2020 |
| JP | 2021520620 A | 8/2021 |

(Continued)

OTHER PUBLICATIONS

Amazon.com: Govee Immersion TV LED Backlights with Camera, RGBIC Ambient Wi-Fi TV Backlights for 55-65 inch TVs PC, Works with Alexa & Google Assistant, App Control, Lights and Music Sync, Adapter, H6199. Reviewed Sep. 22, 2024.

(Continued)

*Primary Examiner* — Robert J May

(57) ABSTRACT

A bracket for mounting a light strip on a surface. The bracket comprises two components each with a light strip holder. A light strip path is defined between both light strip holders. The bracket comprises a hinge connecting the two components and enabling them to swing towards one another. The hinge and both components avoid light strip path when the components swing towards one another.

15 Claims, 9 Drawing Sheets

(56) References Cited

FOREIGN PATENT DOCUMENTS

WO     2017093063 A1    6/2017
WO     2021249787 A1    12/2021

OTHER PUBLICATIONS

How to Add LED Backlighting To Any TV in Five Minutes! Https://www.wherethesmileshave been.com/how-to-add-led-backlighting-to-any-tv-in-five-minutes; Jan. 7, 2022, 22 pgs.
TV LED Backlights, 2.5m LED Strip Light for 32-58 inch, 8.2ft USB TV Bias Lighting with Remote, Bason 5050 RGB Strip Light for TV, PC Monitor, Computer Ambient Lighting; Jan. 7, 2022.

* cited by examiner

--Prior Art--

--Prior Art--

--Prior Art--

BRACKET FOR A LIGHT STRIP

CROSS-REFERENCE TO PRIOR APPLICATIONS

This application is the U.S. National Phase application under 35 U.S.C. § 371 of International Application No. PCT/EP2023/058766, filed on Apr. 4, 2023, which claims the benefit of European Patent Application No. 22173539.2, filed on May 16, 2022, and International Application No. PCT/CN2022/086354, filed on Apr. 12, 2022. These applications are hereby incorporated by reference herein.

FIELD OF THE INVENTION

The present invention relates to the field of light strips, and in particular to the mounting of lights strips using a bracket.

BACKGROUND OF THE INVENTION

There is an increasing trend for mounting light strips upon the backside of electrical devices, particularly display screens such as computer monitors and/or televisions screens, e.g., for providing ambient light effects. To achieve such mounting, one or more brackets are required to support the light strip.

A problem with display screens, and other possible surfaces to which a bracket can be secured, is that they are often curved. Accordingly, there is a need for a bracket that can account for such curves.

There is an ongoing desire for improved brackets that can securely mount a light strip without damaging or breaking the light strip, particularly if a change in light strip direction (e.g., at the corners of the backside of the monitors and/or TV screens) is required.

SUMMARY OF THE INVENTION

The invention is defined by the claims.

According to examples in accordance with an aspect of the invention, there is provided a bracket for mounting a light strip, the bracket comprising: a first component in a first plane comprising a first light strip holder for holding the light strip in a first direction; a second component in a second plane comprising a second light strip holder, separated from the first light strip holder, for holding the light strip in a second, different direction to thereby define a light strip path between the first light strip holder and the second light strip holder; and a hinge configured to rotatably connect the first component to the second component, wherein the bracket is configured to allow the hinge to move relative to the light strip path as the first and second components swing towards one another about an axis of the hinge, wherein the hinge, the first component and the second component avoid the light strip path as the hinge moves relative to the light strip path; wherein the axis is substantially perpendicular to a bending axis of the light strip path.

Brackets for mounting a light strip along a corner, or any change in direction, are designed to hold the light strip in a curved shape. However, issues arise when the surface on which the bracket is mounted is not flat relative to the bracket (e.g. some surfaces behind monitors/TVs). In these cases, the bracket could be bent such that all of the bracket can be mounted to the surface. However, the bending action causes unwanted forces on the light strip which can cause unintentional damage.

Thus, a bracket is proposed which can bend around a hinge, and thus be mounted to curved and slanted surfaces, without applying unwanted forces to the light strip when mounted. The bracket has light strip holders which guide the light strip along two different directions, thereby bending the light strip from the first direction to the second direction. The unwanted forces are not applied during the bending as the hinge and the first and second components are allowed to move with respect to the light strip.

If a light strip moves with the hinge as the components are swung towards each other, the light strip will be stretched out in the space between the light strip holders. However, if the hinge and the components are allowed to move relative to the light strip, the light strip avoids being stretched by the hinge as it can stay in a position where it is not stretched as the hinge and components move relative to each other.

The actions of bending the bracket and swinging the components towards each other are meant to refer to the same action.

The first light strip holder may comprise a first wall section extending, in a substantially perpendicular direction to the first plane of the first component, from a first edge of the first component, a first arm section extending, in a substantially parallel direction to the first plane of the first component, from a first portion of the first edge of the first component and a first arm wall section extending, in a substantially perpendicular direction to the first plane of the first component, from a first arm edge of the first arm section. The first portion may be a portion of the first edge substantially distal from the hinge.

The second light strip holder may comprise a second wall section extending, in a substantially perpendicular direction to the second plane of the second component, from a first edge of the second component, a second arm section extending, in a substantially parallel direction to the second plane of the second component, from a first portion of the first edge of the second component and a second arm wall section extending, in a substantially perpendicular direction to the second plane of the second component, from a second arm edge of the second arm section.

The arm wall sections only extend from first portions of the first edge (i.e. close to an edge of the components distal from the hinge). This is because it has been found that when the arm wall sections extend from or near an edge proximal to the hinge, they cause the unwanted forces when the components are rotated.

The first portion of the first edge of the first component and the second component may be contained within a continuous portion of the first edge beginning at a point on the first edge most distal from the hinge and covering no more than half of the first edge of the first component and the second component respectively.

The hinge may be configured such that a maximum change in the angle between the first and second components is substantially equal to the tangent of a height of the arm wall section over a width of the arm section.

The maximum change in angle may be less than or equal to 32 degrees.

The first direction may be at an angle of between 70 and 110 degrees with the second direction. This enables the light strip to be bent at an angle of between 70 and 110 degrees as the light strip holders guide the direction of the light strip. The particular angle will depend on the required change in direction.

The smallest angle between the first direction and the axis of the hinge and the smallest angle between the second direction and the axis at the hinge may be between 30 and 60 degrees.

A first edge of both the first and second components may comprise a curved portion adjacent to an edge proximal to the hinge. The curved portions may provide a support for the light strip as it is changing direction, wherein the support provided to the light strip is in a direction which does not cause the light strip to shear.

The bracket may further comprise an adhesive for fixing a back surface of the bracket to an external surface.

The bracket may further comprise a conforming material between the back surface of the bracket and the adhesive.

A conforming material enables the bracket to be mounted to a curved or rough surface without the need to adapt the bracket components to the shape of particular surfaces.

The conforming material may be rubber or a similar material.

The thickness of the conforming material may be at least 2 mm and preferably at least 5 mm.

The combined thickness of the adhesive and the conforming material may be at least 2 mm and preferably at least 5 mm.

The conforming material may be a foam tape (e.g. acryl foam tape) coated with adhesive.

The increased height from the adhesive and the conforming material provides additional space below the hinge such that the light strip can move into the space, when the bracket is bent, without an unwanted force being applied to the light strip from the surface onto which the bracket is mounted. Depending on the shape of the surface onto which the bracket is mounted, it may be possible for the surface to exert an unwanted force onto the light strip when the bracket is attached to the surface. Thus, the additional height avoids the unwanted forces being applied to the light strip by said surface.

Additionally, providing the afore-mentioned thickness for the adhesive and conforming material avoids the need for thicker first and second components in these cases.

The hinge may comprise a flexible portion which bridges the first component and the second component. This enables the bracket to be manufactured as a single piece instead of having to manufacture two individual components and join them with a separate hinge. The first and second component may be made at least partly of the flexible portion.

The flexible portion may be made of polyamides.

The thickness of the flexible portion may be less than the thickness of either of the first component and the second component.

In an embodiment, the bracket is made of a single piece of material and the hinge is a groove between two components, in other words, the hinge is a thickness-reduction area between the first component and the second component.

The first component may comprise a first flap portion extending from a second edge of the first component and the second component may comprise a second flap portion extending from a second edge of the second component.

The flap portions enable the bracket to attach more securely to the back surface of, for example, a TV or PC (personal computer) monitor.

The first and second components may comprise a first and second base sections respectively and a corresponding light strip holder protruding from each base section. The first component is in a first plane. The first plane is a general plane of the first component as the particular shape of the first component can be changed based on the skilled person's requirements and/or preferences as long as the first component does not interfere with the light strip in a first configuration, in a second configuration or at any point between the first and second configurations nor does it cause any other part of the bracket to interfere with the light strip. The same logic applies to the second plane of the second component.

The first direction of the light strip and the second direction of the light strip can be chosen to change the direction of the light strip. The particular change in direction may depend on physical requirements and/preferences. Generally, a bracket providing a 90 degree change in direction is used for practical purposes. These are typically referred to as corner brackets. However, other angles between the first and second directions may be used and the term "corner bracket" is not limited to a 90 degree change in direction.

The hinge enables a back surface of the first component to swing towards a back surface of the second component.

The bracket may be configured such that the hinge, the first component and the second component do not intersect the light strip path when the first component swings towards the second component.

In a first embodiment, the bracket may comprise a gap from the first component, through the hinge, to the second component such that the light strip path moves into the gap, relative to the hinge and the first and second components, when the first component swings towards the second component.

In particular, the gap may be formed between the first light strip holder and the second light strip holder. The gap may cover more than half of the light strip path between the light strip holders. At least a third of the gap may be formed on the first component and at least a third of the gap may be formed on the second component. For example, half of the gap may be on either side of the hinge. The gap should generally follow the shape of the light strip path or at least be capable of containing the light strip path whilst the bracket is being bent.

In a second embodiment, the first light strip holder and the second light strip holder are adapted to hold the light strip away from a base section of the corresponding component and the hinge (e.g., above the first and second components and the hinge). The distance between the light strip path and the first and second components, and the hinge, may be chosen such that the light strip path is, at all points on the light strip path, at least at a minimum distance from the hinge and the base sections of the first and second components when the bracket is in the first configuration (i.e. not bent). The hinge may be adapted to not be able to move more than the minimum distance relative to the light strip path. The minimum distance may be defined by the maximum possible distance which the hinge, the first component or the second component can move relative to the light strip path when the bracket is fully bent.

In a third embodiment, the light strip holders protrude from the back surface of the corresponding components such that the hinge and both components move away from the light strip path when the first component swings towards the second component.

The light strip path may be a one dimensional curved line between the light strip holders, a two dimensional curved area between the light strip holders or a three dimensional curved volume between the light strip holders. The light strip path is, in generally, curved as it is intended to mimic the position of a hypothetical light strip path being held by the bracket. The particular size and/or curvature of the light strip path may depend on the intended light strip(s) to be used on the brackets. The light strip path may also be defined by other parts of the bracket which do not intersect the light strip path when the bracket is bent (e.g. wall sections).

The conforming material and adhesive may be used on any of the three embodiments mentioned above. Alternatively, rigid legs (or similar) may be used to the lift the bracket above the surface (e.g. TV rear surface).

A hinge axis is an axis traversing the hinge and around which the components rotate when the first component is swung towards the second components. The hinge axis may be at an angle of between 30-60 degrees from the first and second directions in the first configuration (i.e. flat bracket). For example, the hinge axis may be at an angle of around 45 degrees (e.g. between 40 and 50 degrees).

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
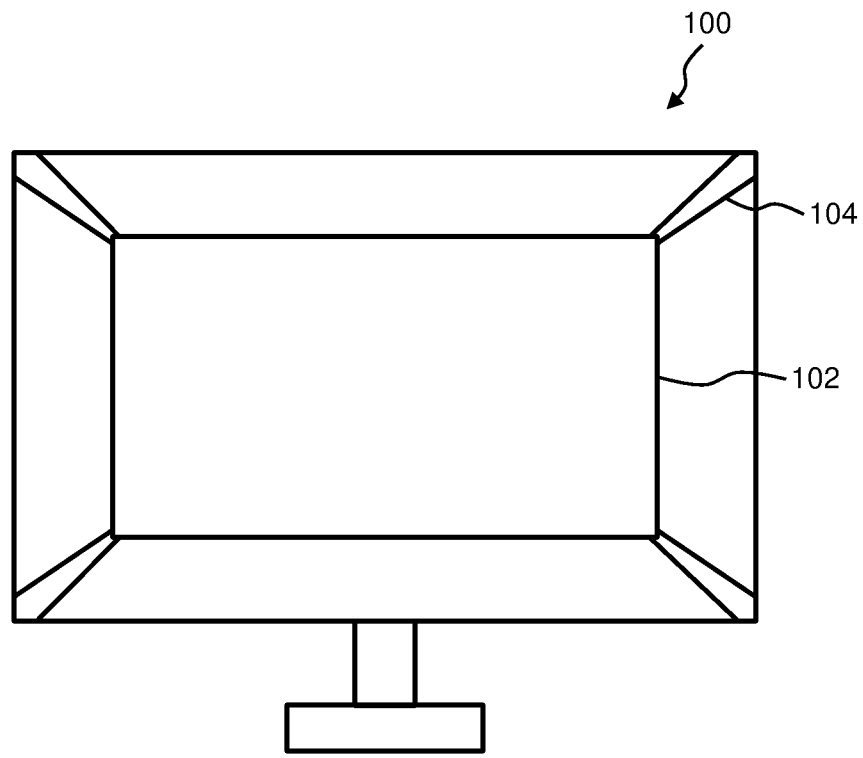
FIG. 1 shows the back of a typical monitor.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a bracket for mounting a light strip on a surface. The bracket comprises two components each with a light strip holder. A light strip path is defined between both light strip holders. The bracket comprises a hinge connecting the two components and enabling them to swing towards one another. The hinge and both components avoid the light strip path when the components swing towards one another.

Brackets for light strips are typically placed on the back of a monitor (e.g. a PC monitor) or a television (TV), for ambient light effect (or called ambient lighting). When users want to mount a light strip on the back of a monitor or a TV, they need a set of brackets to support the light strip. However, the back of monitor/screen is not always flat which makes it difficult to mount typical brackets, especially at corners.

FIG. 1 shows the back of a typical monitor 100. The monitor 100 has a raised section 102. The raised section 102 is usually raised in order to house components of the monitor 100. In this case, the monitor 100 also has curved surfaces 104 at the corners where the raised section 102 joins the edges of the monitor 100.

Figure 2:
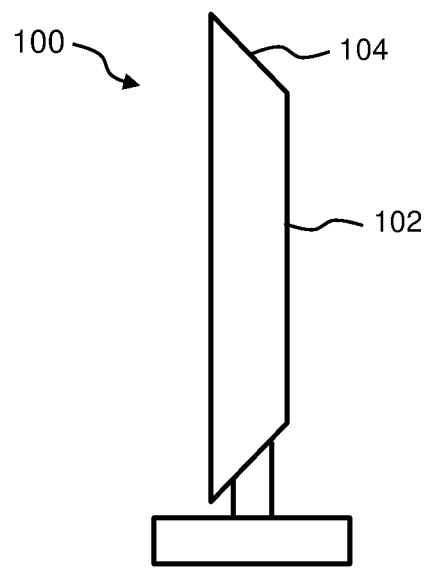
FIG. 2 shows a side-view of the monitor.

FIG. 2 shows a side-view of the monitor 100. The curved surfaces 104 are diagonal to the raised surface 100. A user will typically want to mount the light strip towards the edges of the back of the monitor 100. Thus, the brackets used to mount the light strip at the curved surfaces 104 need to be able to mount the light strip on a curved surface which is at a diagonal relative to the intended placement of the light strip. However, different monitors 100 have different curvature at its rear sides and thus it is wasteful and inefficient to design individual brackets for them solely for this purpose. Thus, it may be beneficial for brackets to match various surfaces, including curved and/or diagonal surfaces.

Figure 3:
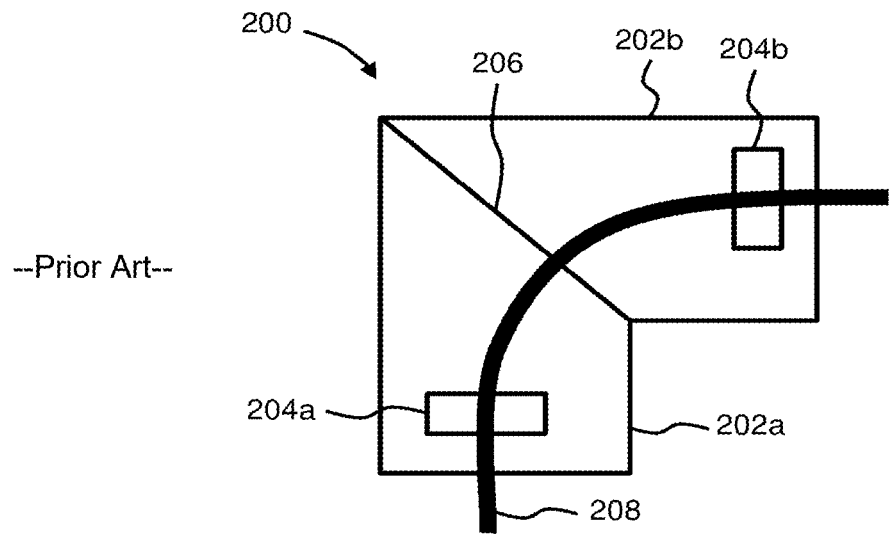
FIG. 3 shows an illustration of a bracket of prior art.

FIG. 3 shows an illustration of a known bracket 200. The bracket 200 comprises two components 202a and 202b with light strip holders 204a and 204b respectively for holding a light strip 208. A hinge 206 is used between the components 202a and 202b such that they can swing towards one another and therefore conform to non-flat surfaces such as the curved surface 104 shown in FIGS. 1 and 2.

Consumers wish to use brackets 200 to install light strips 208 on curved surfaces. The hinge 206 will enable the components 202a and 202b to swing towards one another to match the curved surface.

However, for the bracket of FIG. 3, when users mount the light strip 200 on the bracket and then bend the bracket, the components 202a and 202b or the hinge 206 would make contact with and apply force to the light strip, thereby distorting the light strip and even causing damage to the light emitting diodes (LEDs) or other components in the light strip.

Figure 4:
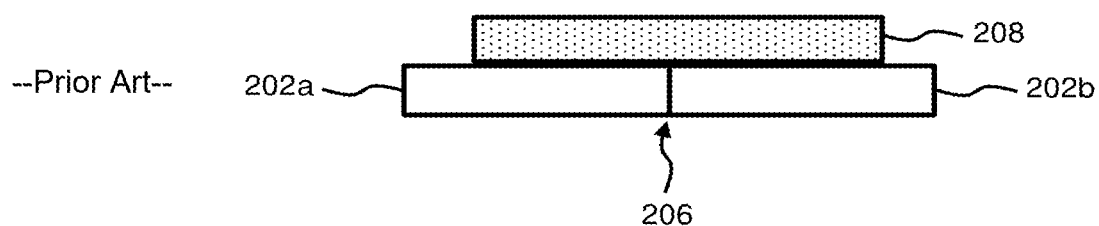
FIG. 4 shows a side-view of the bracket of FIG. 3 in a first configuration.

FIG. 4 shows a side-view of the bracket 200 in a first configuration. A light strip 208 is mounted on the bracket 200. In the first configuration, the components 202a and 202b are not swung towards each other. In the first configuration, the light strip 208 sits flat on the components 202a and 202b.

Figure 5:
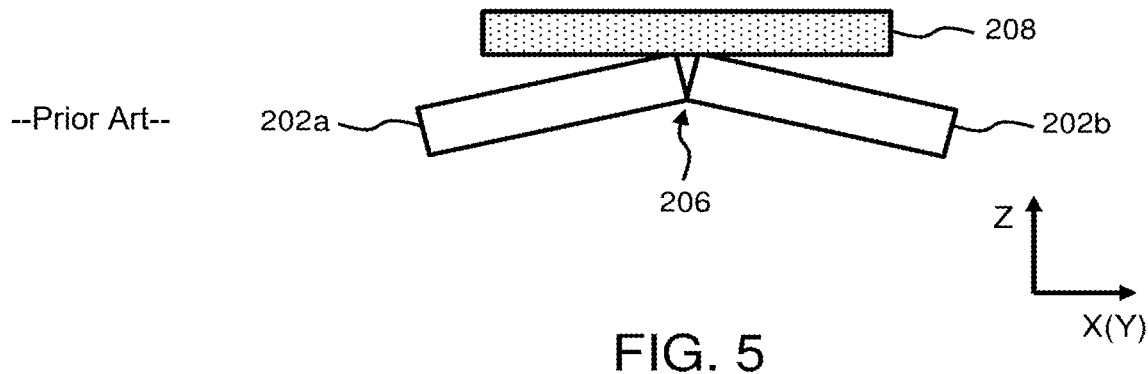
FIG. 5 shows a side-view of the bracket of FIG. 3 in a second configuration.

FIG. 5 shows a side-view of the bracket 200 in a second configuration. A light strip 208 is mounted on the bracket 200. In the second configuration, the components 202a and 202b are swung towards each other. The edges of the components 202a and 202b are the only parts of the bracket 200 in contact with the light strip 208 near the hinge 206.

A user will typically apply a force to the sides of the bracket 200 to install the bracket 200 with the light strip 208 on the bracket 200. However, this causes an unwanted force in the Z direction, as shown in FIG. 5, to be exerted by the bracket from the components 202a and 202b to adapt the light strip 208 to the surface. The unwanted force being applied to the light strip 208 by the small area of contact of the bracket 200 near the hinge can cause damage to the light strip 208.

Figure 6:
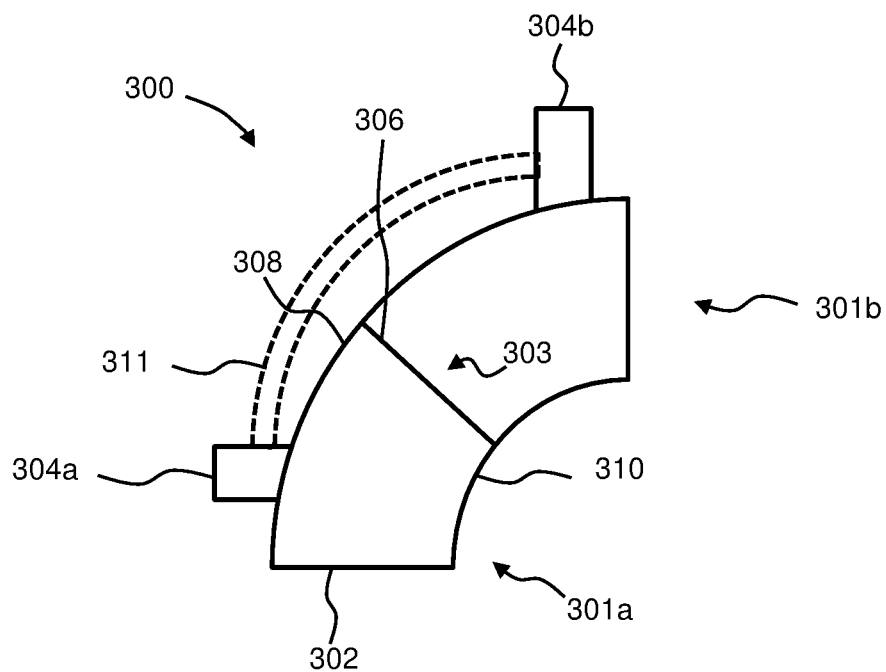
FIG. 6 shows an illustration of a bracket according to present application for mounting light strips.

FIG. 6 shows an illustration of a bracket 300 for mounting light strips according to the present disclosure. The bracket 300 comprises a first component 301a and a second component 301b with a hinge 306 between both components. The first component 301a has a first light strip holder 304a and the second component 301b has a second light strip holder 304b. A light strip path 311 is defined between the ends of the first light strip holder 304a and the second light strip holder 304b as shown in FIG. 6.

The light strip path 311 defines the location or path that would be occupied by a light strip that is held by and between the first and second light strip holders 304a, 304b.

In this case, both components comprise a first edge 308, a second edge 310, a third edge 302 and a fourth edge 303. The first edge 308 may be referred to as an outer edge and is proximal to the light strip path 311. The second edge 310 may be referred to as an inner edge and is distal from the light strip path 311. The third edge 302 may be referred to as a distal edge and is distal relative to the hinge 306. The fourth edge 303 may be referred to as a proximal edge and is proximal to the hinge 306. The hinge 306 joins the proximal edges 303 of the first component 301a and second component 301b to allow them swing about an axis of the hinge 306. The outer edge 308 may comprise a wall section (not shown) to support a light strip. The inner edge 310 may comprise a flap portion (not shown) to align the bracket 300 onto a curved surface when it is mounted.

The first light strip holder 304a is for holding the light strip in a first direction and the second light strip holder 304b is for holding the light strip in a second, different, direction. This is to enable the light strip to change direction (e.g. around a corner) whilst being mounted. Thus, the light strip path 311 forms a bent or curved shape, as the direction of the light strip when held by the light strip holders 304a, 304b changes. The bent or curved shape may have one or more bending axis (axes).

The axis of the hinge 306 is substantially perpendicular to the bending axis. In other words, when the first component 301a and second component 301b swing towards one another, the hinge moves relative to the light strip path, and the hinge, the first component and the second component avoid the light strip path, thus not harm the light strip with shear force.

Each light strip holder 304a, 304b may be mounted or connected to an outer edge 308 of a respective component 301a, 301b.

The light strip holders 304a and 304b are preferably placed closer to the distal edges 302 than the proximal edges (and therefore the hinge 306) to provide the light strip enough space to change from the first direction to the second direction with reduced stresses. Of course, the amount of spacing between the light strip holders needed may depend at least partly on the size of the bracket and the mechanical properties of intended light strips.

The light strip path 311 generally defines where a light strip will be positioned or located when mounted on the bracket 300. Of course, the particular shape of the light strip path 311 will depend on the particular type of light strip used and its mechanical properties, e.g., how it curves around a corner. A more generic light strip path 311 could be defined that encompasses various designs of light strips. The generic light strip path 311 may effectively match, mirror or emulate a curved shape of the bracket 300, although this is not essential (e.g., if the bracket is not curved).

This design of the bracket 300 "cuts out" a middle section of the bracket 300 thereby forming a gap below the light strip path 311. In other words, a gap is formed between the light strip holders 304a and 304b, to provide a space beneath, or in the vicinity, of the light strip path 311. Thus, when a user installs the light strip on the bracket 300, and the bracket is bent about the hinge, the middle part of the components 301a and 301b and the hinge 306 will be able to move relative to the light strip path 311 and, thus, there will be no resistance or unwanted forces on a mounted light strip. In other words, the movement of the first component 301a and second component 301b in Z-direction, prevents Z-direction force to be applied to the light strip to cause shearing of the light strip, which is bent in X-Y plane.

Put another way, no or negligible additional parts of the bracket will come into contact with a light strip mounted to the light strip holders 304a, 304b as the bracket is bent and unbent about the hinge, i.e. as the two components 301a, 301b swing towards and away from one another, i.e., as the bracket moves between the first (unbent) configuration and a second (bent) configuration.

Figure 7:
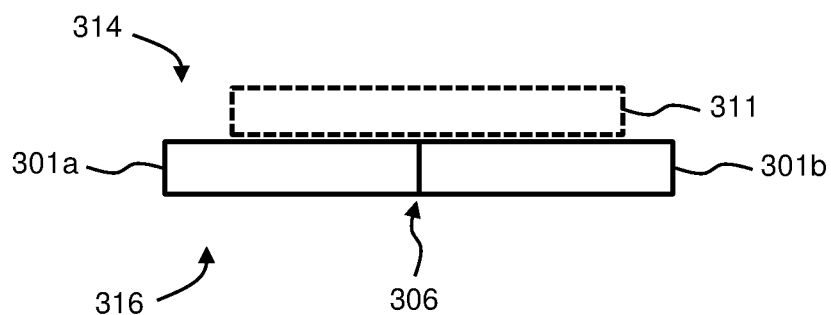
FIG. 7 shows a side-view of the bracket of FIG. 6 in the first configuration.

FIG. 7 shows a side-view of the bracket 300 in the first configuration. In the first configuration, the bracket 300 is not bent. The light strip path 311 is above a top surface 314 of both the first component 301a and the second components 301b. The top surface 314 is the opposite surface of the bottom surface 316, wherein the bottom surface 316 is the surface which is attached to the required surface (e.g. rear side of a monitor).

Figure 8:
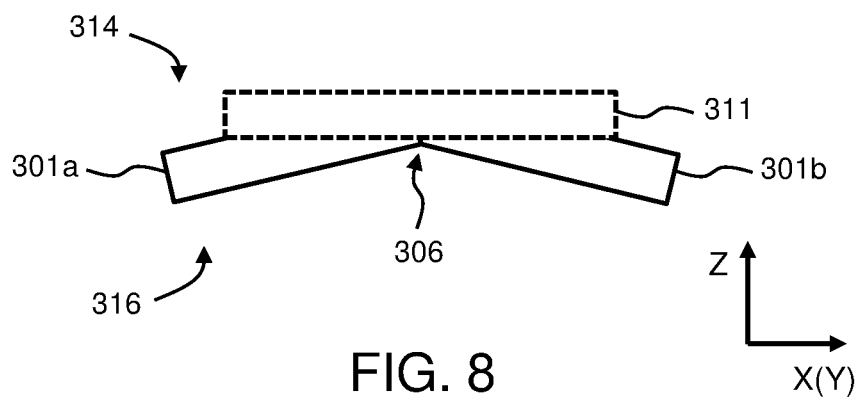
FIG. 8 shows a side-view of the bracket of FIG. 6 in the second configuration.

FIG. 8 shows a side-view of the bracket 300 in the second configuration. In the second configuration, the back surfaces 316 of both the first component 301a and the second component 301b have been swung towards one another via the hinge 306. In contrast to the bracket 200 shown in FIG. 5, the top surface 314 of the components 301a and 301b do not contact or move into the light strip path 311, i.e., they avoid the light strip path. This is due to the gap in the bracket formed in the vicinity of the light strip path 311, e.g., below the light strip path, shown in FIG. 6.

The gap enables the components 301a and 301b and the hinge 306 to move relative to the light strip path 311 when changing from the first configuration to the second configuration. Thus, there would be no additional force from the bracket 300 on a light strip, and particularly on the light strip in the light strip path between the two light strip holders 304a, 304b, when switching from the first configuration to the second configuration. This would significantly reduce the risk of damaging the light strip.

The general idea is to avoid unwanted forces on the light strip due to the change in shape of the bracket 300 when swinging the components towards one another (i.e. when bending the bracket 300). A gap in the middle section of the bracket 300, as shown in FIG. 6, is one of the bracket designs which achieves this goal. However, one can envision other bracket designs which can also achieve the same goal. For example, the light strip could be mounted at a certain height away from the components and the hinge such that the components and the hinge do not reach the light strip, i.e., avoid the light strip path, when changing from the first configuration to the second configuration. In another example, the light strip could be mounted at the back surface of the components such that the components and the hinge move away from the light strip when changing from the first configuration to the second configuration.

When the bracket is made from a flexible substrate, forces in the X direction, as shown in FIG. 8, will only bend the light strip without causing damage to the light strip. However, forces in the Z direction may cause the light strip to shear which could damage the light strip. Of course, brackets made from non-flexible substrates could also apply a force in the Z direction to the light strip and thus damage the light strip.

FIGS. 9 to 20 provide views of a more detailed example of a bracket 300, for the sake of improved conceptual understanding.

Figure 9:
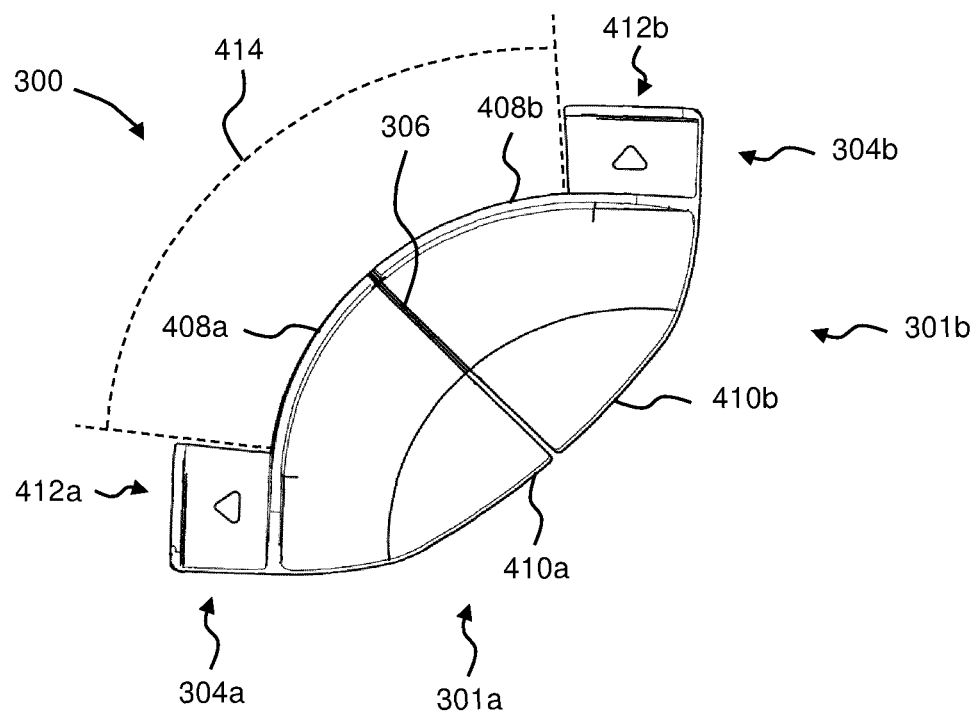
FIG. 9 illustrates a bracket according to an embodiment of present application in the first configuration from a first view.

FIG. 9 illustrates a bracket 300 in the first configuration from a first view. The first view is a top-down view showing the top surface of the bracket 300. The bracket 300 comprises a first component 301a, a second component 301b and a hinge 306 between the components 301a and 301b. The bracket 300 also comprises light strip holders 304a and 304b at first portions of the components 301a and 304a respectively.

The components 301a and 301b comprise wall sections 408a and 408b respectively. The wall sections 408a and 408b extend in a generally perpendicular direction from the top surface of the corresponding component. The wall sections 408a and 408b may further define the light strip path and act to support the light strip when it is mounted to the bracket. The wall sections 408a and 408b also help stop the light strip from moving towards or slipping onto the top of components 301a or 301b, which might otherwise lead to damage of the light strip when the bracket is bent.

The light strip holders 304a and 304b also have arm edges 412a and 412b such that the light strip is placed between the wall sections 408a and 408b and the arm edges 412a and 412b respectively when mounted.

Flap portions 410a and 410b extend from an inner edge of the components 301a and 301b respectively. The flap portions provide alignment of the bracket 300 towards a curved surface when mounted on such surface. The flap portions 410a and 410b are curved in a perpendicular direction to the top surface of the components 301a and 301b and facing away from the top surface of the components 301a and 301b.

The bracket 300 may be made of polyamides. Polyamides generally have good bending properties. However, other suitable materials would be apparent to the skilled person, such as other forms of polymer and/or plastics. Yet other materials include one or more metals, which could provide additional structural support.

The hinge 306 may be a groove formed in the middle part of the bracket 300 (i.e., between the two components 301a, 301b) to ensure that the bracket 300 can be easily bent to fit a corner surface. For instance, the first and second components 301a and 301b may be joined by a thinner layer of flexible material forming the hinge 306 (i.e. a flexible portion).

Preferably, the hinge 306 can be bent, without breaking, at least 100 times. Reliable hinge designs will be known to the skilled person.

The bending range between the first configuration and the second configuration may be between 0 and 32 degrees. In other words, the first component 301a may be able to swing towards the back surface of the second component 301b by at least 32 degrees from the first configuration. Put another way, the first component 301a and the second component 301b may be bent such that a smallest angle between the two components is up to 32 degrees. Other angles may also be used depending on the particular use case, e.g., depending upon an angle made by a corner of the monitor or display onto which the bracket is to be fixed.

Figure 10:
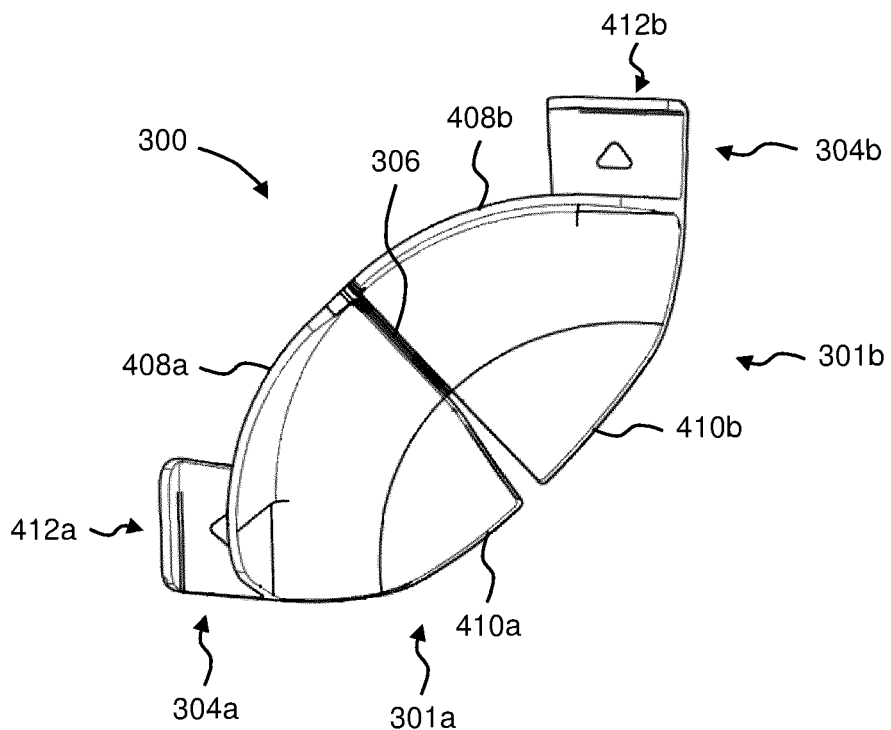
FIG. 10 illustrates the bracket of FIG. 9 in the second configuration from the first view.

FIG. 10 illustrates the bracket 300 in the second configuration from the first view. When a light strip is mounted on the bracket 300, the light strip will fall into a gap 414, shown in FIG. 9, formed between the light strip holders 304a and 304b and the wall sections 408a and 408b, thereby avoiding any unwanted forces from the bracket 300 when it is bent from the first configuration to the second configuration.

The gap 414 shown in the bracket 300, as seen in FIG. 9, forms the edge of a quarter circle.

Figure 11:
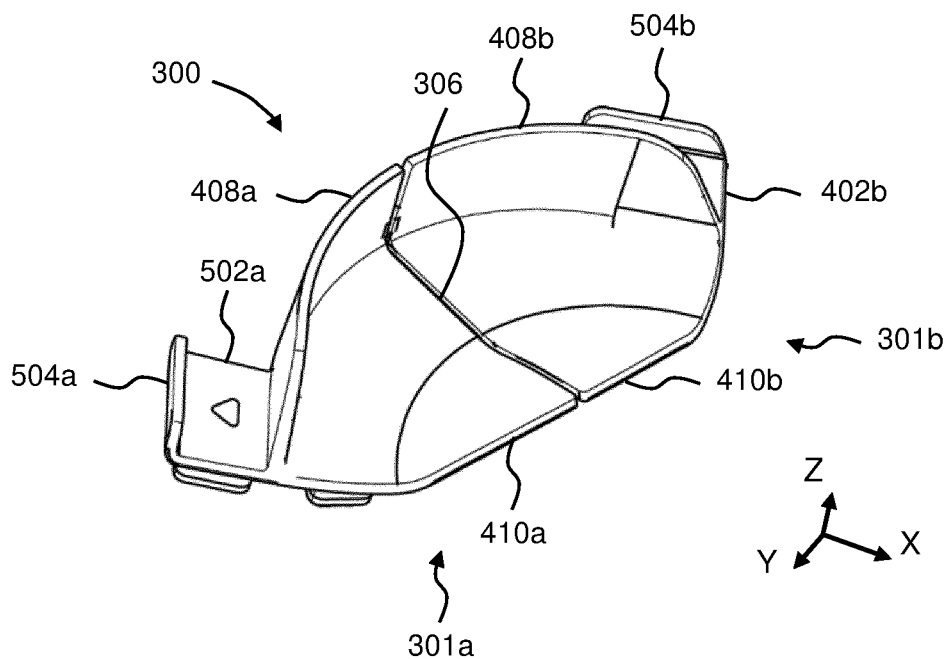
FIG. 11 illustrates the bracket of FIG. 9 in the first configuration from a second view.

FIG. 11 illustrates the bracket 300 in the first configuration from a second view. The second view shows the top surfaces of the bracket 300 from an angle. The light strip holders and comprise arm sections 502a and 502b respectively as well as arm wall sections 504a and 504b.

Arm sections 502a and 502b extend from a first portion of the outer edge 308 of the corresponding components. The first portion is a portion of the outer edge 308 closer to the distal edge 302 than the proximal edge 303. The outer edge 308, the distal edge 302 and the proximal edge 303 are as shown in FIG. 6. In this case, the first portion begins where the outer edge 308 and the distal edge 302 of a component meet.

The arm sections 502a and 502b generally extend in a direction parallel to the plane of the components. In this case, the arm sections 502a and 502b provide a section of the bracket 300 which supports the light strip while also providing a gap 414 between the light strip holders.

The arm wall sections 504a and 504b extend in a direction perpendicular to the top surface, away from the bottom surface, from the arm edge of the corresponding arm section 502a and 502b in a similar way to the wall sections 408a and 408b. The arm wall sections 504a and 504b and the wall sections 408a and 408b provide lateral support for the light strip without exerting unwanted forces in the Z direction on the light strip when the bracket 300 is bent. It is noted that the wall sections 408a and 408b do not exert unwanted forces to the light strip in the Z direction. Forces exerted on the light strip in the X and Y directions will not generally cause the light strip to shear.

To reduce the likelihood of a held light strip slipping off the light strip holders when the bracket 300 is bent, the tangent of the height of the arm wall section over the width of the arm section should be at least the maximum angle in the bending range. Thus, if the bending range is up to 32 degrees, so the tangent of the height of the arm wall section over the width of the arm section should be at least 32 degrees.

Figure 12:
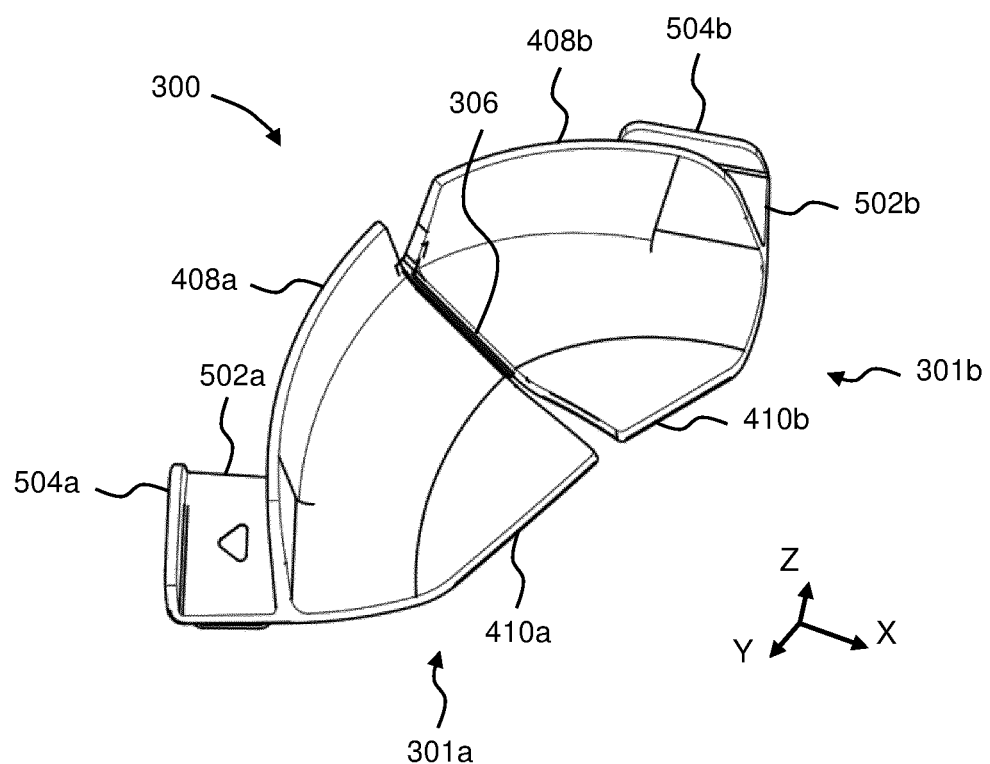
FIG. 12 illustrates the bracket of FIG. 9 in the second configuration from the second view.

FIG. 12 illustrates the bracket 300 in the second configuration from the second view.

Figure 13:
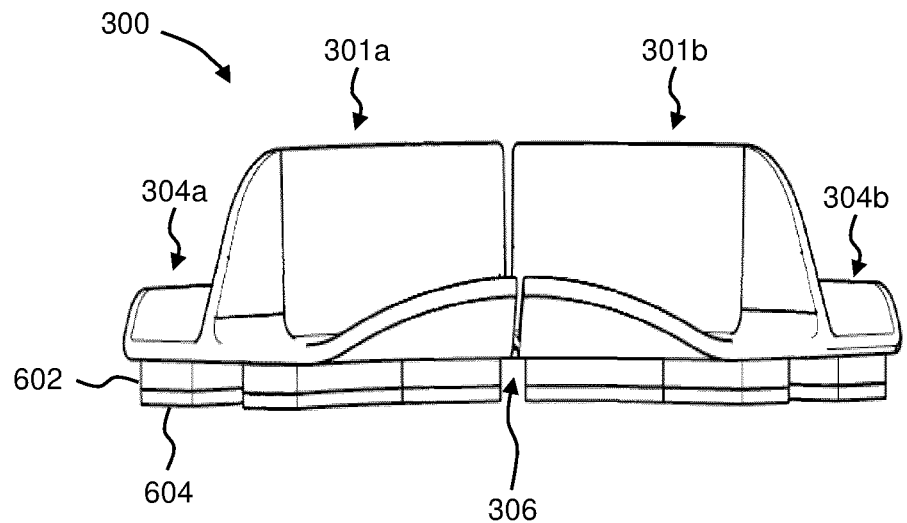
FIG. 13 illustrates the bracket of FIG. 9 in the first configuration from a third view.

FIG. 13 illustrates the bracket 300 in the first configuration from a third view. The third view is a side-view of the bracket 300. A conforming material 602 (e.g. rubber) is attached to the back surface of the bracket 300. The conforming material 602 enables the back surface of the bracket 300 to conform to non-flat surfaces. An adhesive 604 (e.g. double sided adhesive tape) is used to fit the back surface of the bracket 300 to the required surface (e.g. a curved surface).

Other forms of conforming material 602 and adhesive 604 could be employed in alternative embodiments. For instance, a gel pad or foam could be used as an alternative conforming material 602. A non-tape based adhesive could be used for the adhesive 604.

The combined height of the conforming material 602 and the adhesive 604 may be at least 2 mm and preferably at least 5 mm. The conforming material and the adhesive may lift the bracket 300 above the surface it is fitted on such that, when the bracket 300 is bent (e.g., up to its maximum allowable bending range) and a light strip falls in the gap, the surface onto which the bracket 300 is attached avoids or reduces the application of undesirable and potentially damaging forces to the light strip. This would advantageously further reduce stress or forces on the light strip.

Figure 14:
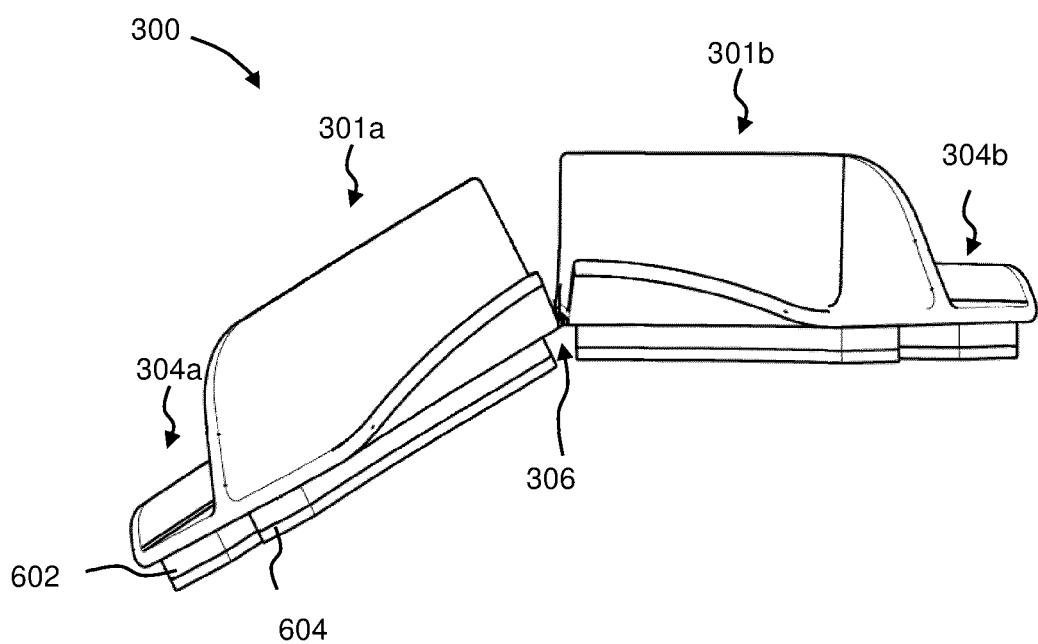
FIG. 14 illustrates the bracket of FIG. 9 in the second configuration from the third view.

FIG. 14 illustrates the bracket 300 in the second configuration from the third view.

Figure 15:
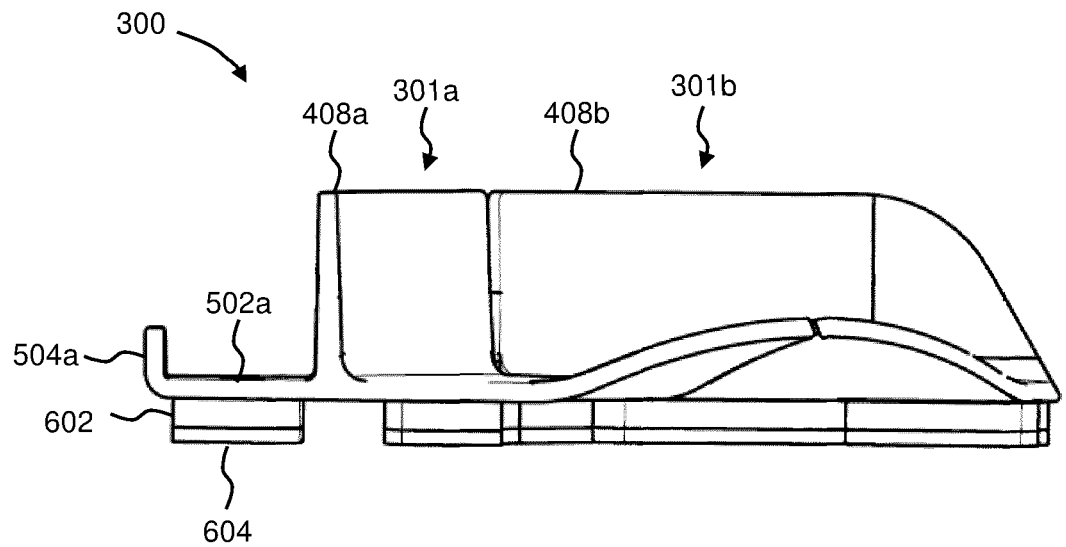
FIG. 15 illustrates the bracket of FIG. 9 in the first configuration from a fourth view.
Figure 16:
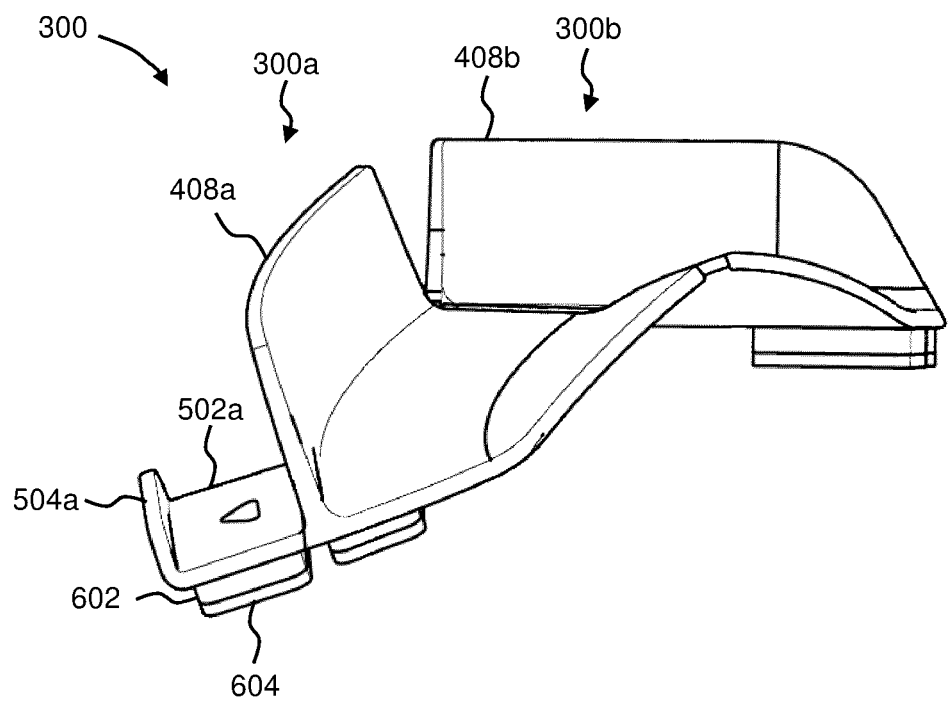
FIG. 16 illustrates the bracket of FIG. 9 in the second configuration from the fourth view.

FIG. 15 illustrates the bracket 300 in the first configuration from a fourth view. The fourth view is a side-view showing a head-on view of the first light strip holder. FIG. 16 illustrates the bracket 300 in the second configuration from the fourth view.

Figure 17:
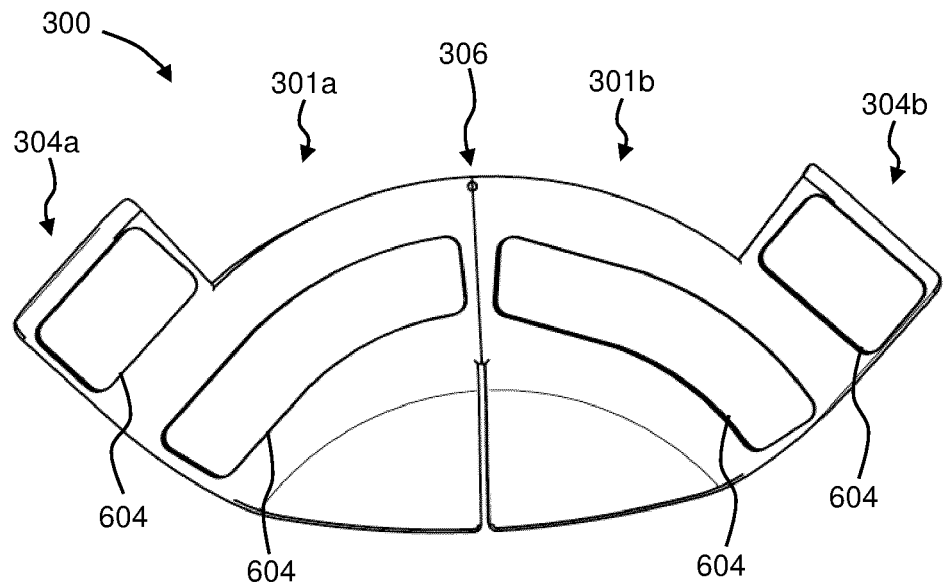
FIG. 17 illustrates the bracket of FIG. 9 in the first configuration from a fifth view.
Figure 18:
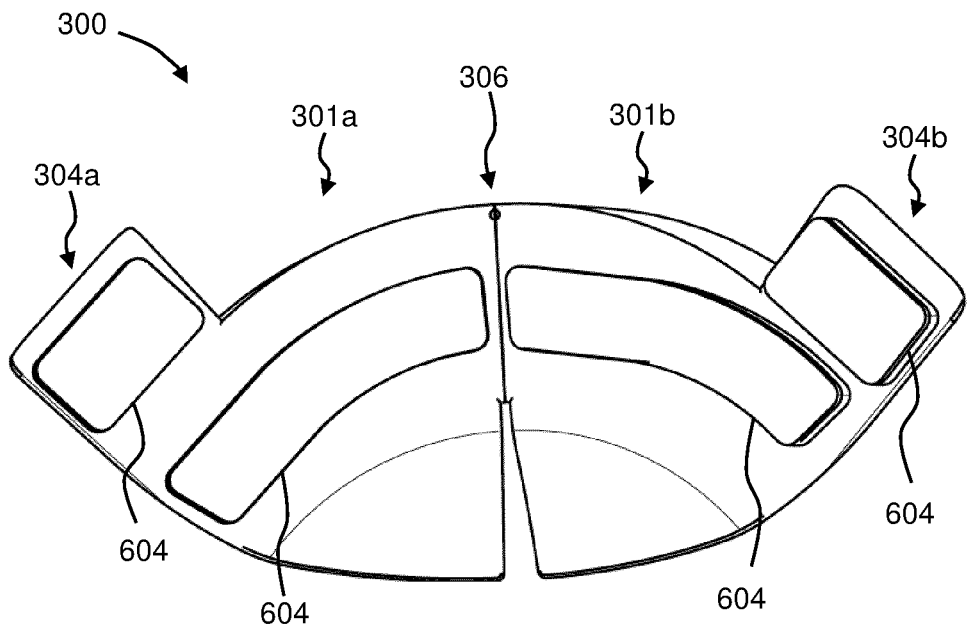
FIG. 18 illustrates the bracket of FIG. 9 in the second configuration from a fifth view.

FIG. 17 illustrates the bracket 300 in the first configuration from a fifth view. From the fifth view, the back surface of bracket 300 can be seen. An exemplary placement of the adhesive 604 on the back surface is shown. In the illustrated example, the adhesive 604 is formed from adhesive strips placed on the back surfaces of the light strip holders 304a and 304b and the back surfaces of the components 301a and 301b. FIG. 18 illustrates the bracket 300 in the second configuration from a fifth view.

Figure 19:
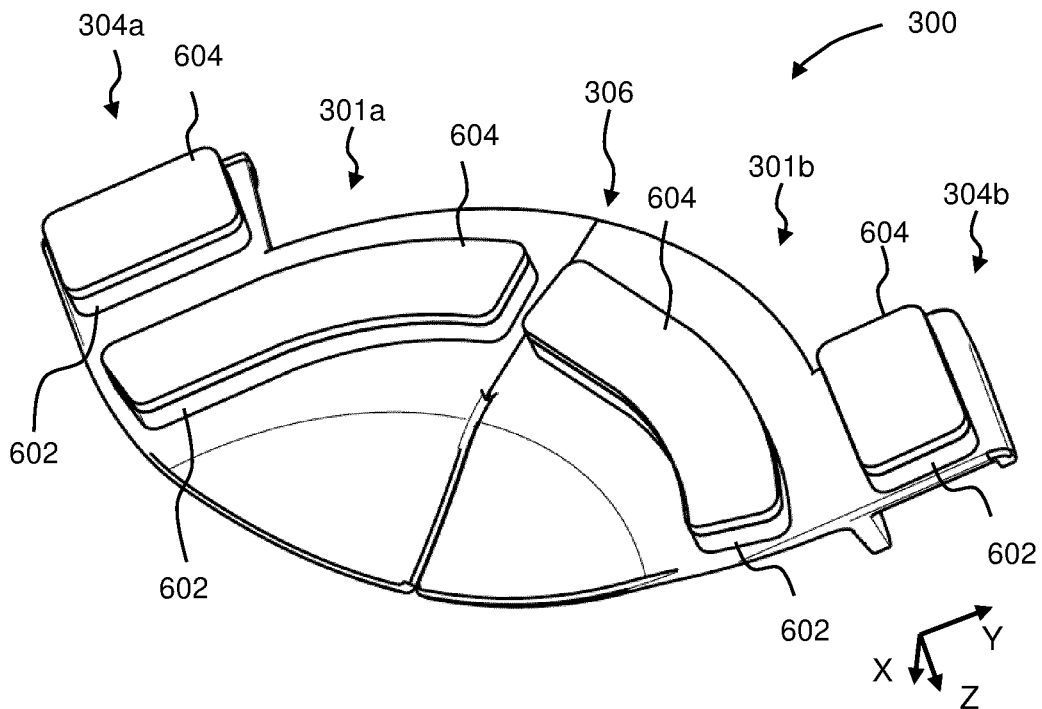
FIG. 19 illustrates the bracket of FIG. 9 in the first configuration from a sixth view.
Figure 20:
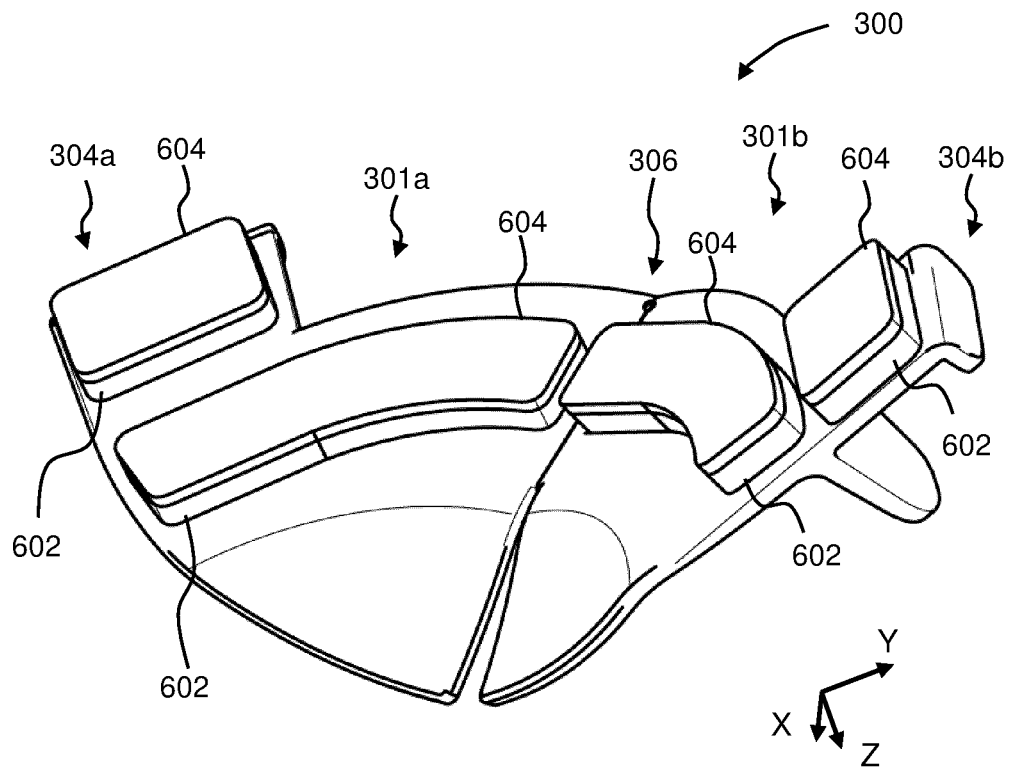
FIG. 20 illustrates the bracket of FIG. 9 in the second configuration from the sixth view.

FIG. 19 illustrates the bracket 300 in the first configuration from a sixth view. The sixth view shows the back surfaces of the bracket 300 from an angle. FIG. 20 illustrates the bracket 300 in the second configuration from the sixth view.

When the bracket 300 is made from flexible material, the hinge 306 may be a groove between the first component 301a and the second component 301b. This reduces the shrinking stress when the bracket is bent.

During use, the bracket 300 is typically attached to a surface (e.g. the back of PC monitor/TV). For curved corner surfaces, the bending angle of the bracket 300 is adjusted to match the curved surface and bracket 300 is attached to the back of the PC monitor/TV whilst bent at the required angle.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A bracket for mounting a light strip, the bracket comprising:
   a first component in a first plane comprising a first light strip holder for holding the light strip in a first direction;
   a second component in a second plane comprising a second light strip holder, separated from the first light strip holder, for holding the light strip in a second, different direction to thereby define a light strip path between the first light strip holder and the second light strip holder; and
   a hinge configured to rotatably connect the first component to the second component, wherein the bracket is configured to allow the hinge to move relative to the light strip path as the first and second components swing towards one another about an axis of the hinge, wherein the hinge, the first component and the second component avoid the light strip path as the hinge moves relative to the light strip path;
   wherein the axis is substantially perpendicular to a bending axis of the light strip path.

2. The bracket of claim 1, wherein:
the first light strip holder comprises:
   a first wall section extending, in a substantially perpendicular direction to the first plane of the first component, from a first edge of the first component;
   a first arm section extending, in a substantially parallel direction to the first plane of the first component, from a first portion of the first edge of the first component; and
   a first arm wall section extending, in a substantially perpendicular direction to the first plane of the first component, from a first arm edge of the first arm section, and
the second light strip holder comprises:
   a second wall section extending, in a substantially perpendicular direction to the second plane of the second component, from a first edge of the second component;
   a second arm section extending, in a substantially parallel direction to the second plane of the second component, from a first portion of the first edge of the second component; and
   a second arm wall section extending, in a substantially perpendicular direction to the second plane of the second component, from a second arm edge of the second arm section.

3. The bracket of claim 2, wherein the first portion of the first edge of the first component and the second component is contained within a continuous portion of the first edge beginning at the point on the first edge most distal from the hinge and covering no more than half of the first edge of the first component and the second component respectively.

4. The bracket of claim 3, wherein the hinge is configured such that a maximum change in the angle between the first and second components is substantially equal to the tangent of a height of the arm wall section over a width of the arm section.

5. The bracket of claim 4, wherein the maximum change in the angle is less than or equal to 32 degrees.

6. The bracket of claim 1, wherein the first component and the second component are mirror symmetric with respect to hinge.

7. The bracket of claim 1, wherein the first direction is at an angle of between 70 and 110 degrees with the second direction.

8. The bracket of claim 1, wherein the smallest angle between the first direction and the axis of the hinge and the smallest angle between the second direction and the axis at the hinge is between 30 and 60 degrees.

9. The bracket of claim 1, further comprising an adhesive for fixing a back surface of the bracket to an external surface.

10. The bracket of claim 9, further comprising a conforming material between the back surface of the bracket and the adhesive.

11. The bracket of claim 10, wherein the thickness of the conforming material or the combined thickness of the adhesive and the conforming material is at least 2 mm and preferably at least 5 mm.

12. The bracket of claim 1, wherein the hinge comprises a flexible portion which bridges the first component and the second component.

13. The bracket of claim 12, wherein the flexible portion is made of polyamide.

14. The bracket of claim 12, wherein the thickness of the flexible portion is less than the thickness of either of the first component and the second component.

15. The bracket of claim 1, wherein:
the first component comprises a first flap portion extending from a second edge of the first component; and
the second component comprises a second flap portion extending from a second edge of the second component.

\* \* \* \* \*